United States Patent [19]

LeGrand

[11] Patent Number: 4,645,708
[45] Date of Patent: Feb. 24, 1987

[54] INTERNAL PROTECTIVE COATINGS FOR SENSITIVE RESINOUS LAMINAE

[75] Inventor: Donald G. LeGrand, Burnt Hills, N.Y.

[73] Assignee: General Electric Company, Pittsfield, Mass.

[21] Appl. No.: 639,711

[22] Filed: Aug. 13, 1984

[51] Int. Cl.⁴ .................. B32B 27/08; B32B 27/30; B32B 27/36; B32B 17/10
[52] U.S. Cl. .................. 428/215; 428/412; 428/522; 428/524; 428/414; 428/415; 428/425.3; 428/424.4; 428/437; 156/106; 156/327
[58] Field of Search .......... 428/215, 412, 522, 524; 156/106, 327

[56] References Cited

U.S. PATENT DOCUMENTS

| | | | |
|---|---|---|---|
| 3,406,086 | 10/1968 | Foster | 161/183 |
| 3,539,442 | 11/1970 | Buckley et al. | 161/183 |
| 3,666,614 | 5/1972 | Snedeker et al. | 161/183 |
| 4,027,061 | 5/1977 | Cartier et al. | 428/213 |
| 4,046,951 | 9/1977 | Stefanik | 428/412 |
| 4,128,694 | 12/1978 | Fabel et al. | 428/412 |
| 4,312,903 | 1/1982 | Molari | 428/34 |
| 4,328,277 | 5/1982 | Molari | 428/215 |
| 4,404,257 | 9/1983 | Olson | 428/412 |
| 4,439,494 | 3/1984 | Olson | 428/412 |
| 4,514,464 | 4/1985 | Gomez | 428/332 |

FOREIGN PATENT DOCUMENTS 53-023313  3/1978  Japan .

Primary Examiner—P. C. Ives
Attorney, Agent, or Firm—John W. Harbour; William F. Mufatti; Edward K. Welch, II

[57] ABSTRACT

Thermoplastic laminae are given scratch and mar resistance on an external face as well as protection from incompatible additives of adjacent adhesive layers on an internal face by a single cross-linked protective coating.

16 Claims, No Drawings

INTERNAL PROTECTIVE COATINGS FOR SENSITIVE RESINOUS LAMINAE

This invention relates to a method for protecting thermoplastic resinous laminae or layers which are sensitive to additives of an adjacent adhesive interlayer and to the laminate or multi-layer composite so produced. More particularly the invention relates to a method for making laminates or multi-layer composites wherein sensitive thermoplastic resinous laminae or layers of, for example, polycarbonate are coated on at least one internal face with a cross-linked polymerized protective coating which acts as a barrier to inhibit damaging interaction between adjacent laminae or layers such as may occur with plasticizer migration. Crosslinkable polymerized protective coatings suitable for use in this invention must provide a good substrate for adhesion and are preferably those coatings applied to the external surface of thermoplastic resinous sheets to increase scratch, abrasion and chemical solvent resistance.

BACKGROUND OF THE INVENTION

Laminates and multi-ply plastic and glass composites having at least one lamina or layer of a sensitive thermoplastic resin, such as, polycarbonate are well known and commercially available. In particular, thermoplastic laminae or layers bring to these laminates or composites such properties as high heat resistance, dimensional stability, and especially, high impact strength. These properties render the thermoplastic containing composites amenable to a wide variety of uses, such as for example, aircraft windows, automobile safety glass, or bullet resistant glass.

In such laminates or composites, a thermoplastic resinous lamina or layer is often adhered to a second lamina or layer of for example, polycarbonate, polyacrylate, or glass by means of an adhesive interlayer which may contain additives. Adhesive interlayers are prepared from various synthetic polymers, such as for example, polyvinyl butyral, polyurethane, poly(ethylene-vinylacetate), poly (ethylene-vinylacetate-vinylalcohol), poly (ethylene-methylmethacrylate-acrylic acid), etc.

Unfortunately, many thermoplastic resins are somewhat susceptible to stress cracking and crazing in the presence of a substantial number of organic compounds, particularly many of the organic compounds used as additives in adhesive interlayers. Additives, particularly plasticizers, of the adhesive interlayer often migrate to the interlayer/resin interface and enter the thermoplastic resin resulting in stress cracking, crazing, loss of transparency, and/or loss of adhesion as well as undesirable changes to the physical properties of the thermoplastic resin,. The foregoing is particularly applicable to the widely used polycarbonate resins.

U.S. Pat. No. 3,269,971 assigned to the same assignee at the present invention, discloses the adipates, benzoates, chlorinated hydrocarbons, epoxy compounds, glycerol derivatives, glycolates, phosphates, phosphites, phosphonates, phthalates, etc., as unsatisfactory plasticizers for polycarbonate and discloses instead, the use of the carbonate esters. Although the carbonate esters may be compatible with the polycarbonates, they may not be suitable plasticizers for all adhesive interlayers and regardless of compatibility, their migration into the polycarbonate may injure essential properties of the system.

Laminates containing polycarbonate sheets in contact with plasticized polyvinyl acetal sheets are described in U.S. Pat. Nos. 3,406,086 and 3,539,442. Disclosed plasticizers for the polyvinyl butyral layers are phosphates and sulfonamides respectively and these work very well giving rise to few problems. However, the use of these plasticizers requires that the polyvinyl acetal resin be cast to form a sheet rather than extruded. Extrusion is more efficient to produce large volumes of sheet, but the high temperature ranges used to extrude polyvinyl acetal decompose the recommended plasticizers.

U.S. Pat. No. 4,027,069 discloses a laminated safety glass having at least one layer of glass laminated to at least one layer of plasticized and buffered polyvinyl acetal sheet. A third layer also laminated to the plasticized and buffered polyvinyl acetal sheet may optionally be polycarbonate. However, there is no disclosure of a means to prevent the migration of the plasticizer into the polycarbonate and thereby prevent stress cracking and crazing.

U.S. Pat. No. 4,128,694 discloses a sheet of polycarbonate in face-to-face contact with a sheet of polyvinyl butyral plasticized with an effective amount of plasticizer which plasticizer is at least in part an ester formed by reaction of an alcohol having from 2 to 4 hydroxyl groups and a $C_{16}$–$C_{20}$ unsaturated fatty acid having a hydroxyl group attached to the acid molecule. This invention suffers from the severe limitation on the plasticizer that may be used in the adhesive interlayer.

U.S. Pat. No. 4,328,277, issued to the same assignee as the present invention, describes a polycarbonate back lamina having an external mar-resistant coat as well as an optional internal mar resistant coat, which internal side of the lamina is the side of adherence to an adhesive interlayer. The stated purpose of the mar-resistant coat is to prevent marring during lay-up and the like. This reference does not disclose the use of plasticizers in the adhesive interlayer and furthermore, specifically requires that the interlayer be chemically compatible with the sensitive polycarbonate.

Thus, though use of thermoplastic resins such as polycarbonate in laminates and multi-ply composites can substantially improve shatter resistance, strength, and weight, the use of these resins is severely restricted by incompatibility with the common plasticizers of adjacent layers, in particular, plasticized adhesive interlayers such as polyvinyl butyral adhesive interlayers.

Therefore, it is an object of the present invention to provide a method for preventing the stress crazing and cracking of sensitive thermoplastic resinous laminae or layers, such as, a polycarbonate lamina or layer by incompatible additives of adjacent laminae or layers.

It is another object of the present invention to provide a laminate or multi-layer composite having at least one lamina or layer of a sensitive thermoplastic resin, such as, polycarbonate resin coated with a cross-linked protective coat in face-to-face contact with a plastic lamina or layer containing incompatible additives.

It is yet another object of the present invention to provide sensitive resinous laminae or layers with a single protective coating which protects the interior surface from incompatible adjoining laminae or layers yet which also protects or may become a component of a coating system which protects the external surface from scratch and abrasion.

DESCRIPTION OF THE INVENTIONS

Briefly, according to the present invention, it has been found that sensitive thermoplastic resinous laminae or layers may be more readily employed in laminates or multi-layer composites giving less regard to compatibility with potentially damaging additives of adjacent laminae or layers when they are coated with a cross-linked, polymerized, protective coating. A sensitive thermoplastic resin to which it is particularly desirable to give such protection is polycarbonate resin. Polycarbonate resins are widely used in laminates and multi-layer composites and compatibility with adjoining laminae or layers is often a problem. The cross-linked polymerized protective coating prevents contact of the sensitive resin with incompatible laminae or layers and acts as a barrier to the migration of potentially harmful additives such as plasticizers. Preferably, the cross-linked polymerized protective coating is also suitable for use on an external resinous surface to enhance scratch and mar resistance or is suitable to form a component as for example a primer layer of such a scratch and mar resistant coating system.

The polycarbonate resins in the preferred embodiment of the present invention include all commonly known and widely used thermoplastic polycarbonate resins as well as others. Polycarbonate resins polymerized from an aromatic diol are most commonly used. These and other polycarbonate resins are described in U.S. Pat. Nos. 3,161,615; 3,220,973; 3,312,659; 3,312,660; 3,666,614; among others, all of which are incorporated herein by reference.

Other thermoplastic resinous laminae or layers which may be protected by the present invention include the acrylic resins, methacrylic resins; epoxy resins; polyphenylene oxide and blends of polyphenylene oxide and styrene resin; polyaryl ethers; polyethermides; polyesters; polyphenyl sufides; polysulfones; polyurethanes; ethylene polymers, such as ethyl vinyl acetates; etc.

The practice of the present invention requires that a sensitive thermoplastic resinous lamina adjoin a lamina or layer containing or which may contain through migration additives from which the sensitive thermoplastic requires protection. These additives may be plasticizers, stabilizers, thixotropic agents, etc. which with time migrate to the adhesive interlayer-lamina interface and cause damage to the thermoplastic lamina. Those skilled in the art are capable of determining in any specific instance, whether such migration will cause damage.

The cross-linkable protective coating which is applied to the sensitive thermoplastic resinous lamina or layer may be any polymer or monomer system sufficiently cross-linkable to prevent additive migration into the resin yet which also provides for good adherence to other adjoining laminae. Well known such cross-linkable protective layers are the metal oxides, polyurethanes, silcone resins with recurring organic groups such as polymethyl methacrylate, epoxy resins, and polyamide ester resins among others. Preferred cross-linkable protective layers are the cross-linkable acrylic based copolymers and cross-linkable amine-aldehyde resins.

The cross-linkable acrylic based copolymers of the present invention are well known in the art. Exemplary cross-linkable acrylic based copolymers which may be employed in the practice of this invention are set forth, for example, in *Encyclopedia of Polymer Science and Technology*, Vol. 1, Interscience Publishers, John Wiley & Sons, Inc., copyright 1964, at page 273 et seq., page 246 et seq., and in *Chemistry of Organic Film Formers*, by D. H. Solomon, John Wiley & Sons, Inc., 1967 at page 251 et seq. and the references cited therein, all of which are incorporated herein by reference.

Suitable cross-linkable acrylic based copolymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) acrylic copolymers having a mixture of two cross-linkable functional reactive groups.

Typically, the reactions involved in cross-linking the acrylic based copolymers are reactions between, for example: epoxide functional groups and carboxyl functional groups; epoxide functional groups and N-methylol or N-methylol-ether functional groups; carboxyl functional groups and N-methylol or N-methylol-ether functional groups; inter-reactions between hydroxyl groups, for example, polyols, and isocyanate groups; and reactions between amine groups and N-methylol or N-methylol-ether functional groups.

The required functional group in the cross-linkable acrylic copolymer chain is provided by employing in the copolymerization a monomer which may be either an acrylic or non-acrylic and supplies the required reactive functional group for cross-linking into the acrylic copolymer chain. Usually, this copolymerizable functional group-supplying acrylic or non-acrylic monomer will be present in lesser amounts, that is, on the order of from about 1 mole percent to about 25 mole percent and typically, between about 3 and 20 mole percent of the monomers which are polymerized in the acrylic chain. Exemplary of these functional group-supplying acrylic or non-acrylic monomers are glycidyl acrylate, glycidyl methacrylate, allyl glycidyl ether, dimethylaminoethyl methacrylate, vinyl pyridine, t-butyl aminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate.

The predominant group in the cross-linkable acrylic copolymer chain is provided by employing in the copolymerization non-functional acrylic ester monomers. Typically, these non-functional acrylic esters are a lower ($C_1$-$C_4$) alkyl acrylate, ethyl acrylate, methyl methacrylate, and ethyl methacrylate.

In those mixtures where cross-linking agents are used with the functional groups of the acrylic copolymer, the agent will at least be present in approximately the stoichiometric amounts required. However, in mixtures where the cross-linking agent can react with itself as well as the functional groups of the acrylic copolymer chain, the cross-linking agent may be present in much larger amounts. In such mixtures, the cross-linking agent in sufficient amount will bond with itself through condensation and form a cross-linked system not dominated by the presence of acrylic. Herein, the phrase "acrylic based copolymer" includes both the cross-linkable acrylic chain as well as the cross-linking agent, though the cross-linking agent may be the majority of the polymer.

The preferred cross-linked amine-aldehyde based resin is the reaction product of an aldehyde condensation product of melamine, urea, acetoguanamine or a similar compound with a polyol. Coatings made from these materials are highly cross-linked and mar-resistant.

Preferably, the aldehyde employed is formaldehyde, although the products can be made from other aldehydes, such as acetaldehyde, crotonaldehyde, acrolein, benzaldehyde, furfural and others. While resins produced from melamine are most common and are preferred, condensation products of other amines and amides can also be employed, for example, those of ureas, triazines, diazines, triazoles, guanidines, and guanamines provided at least one amino group is present. Preferably the amine-aldehyde condensation product is etherified and, therefore, requires an acid catalyst for efficient curing. Preferred etherification agents are isopropanol, ethanol, and particularly methanol.

The polyols which are reacted with the amine-aldehyde condensation products to form the cross-linked amine-aldehyde resins may be, for instance, aliphatic polyols, aliphatic polyols with ether linkages, polyester polyols, hydroxy ester functionalized polyacrylates, hydroxy ester functionalized polymethacrylates, hydroxy terminated polycarbonates, etc. Additionally, blends of the above polyols may be employed.

The protective coatings discussed above are usually applied dissolved or emulsified in a liquid carrier system, the function of which is to allow the coating to be applied to the thermoplastic substrate. Many such liquid carrier systems are known to the art, for example, a system may be an organic solvent or mixture of organic and inorganic solvent, a hydroxy ether-water system, or an alkanol-water system. In the application of such cross-linkable protective coatings, it is within the skill of the art to choose proper liquid carrier systems, suitable proportions of polymerizable constituent to liquid carrier system, proper methods of application, and suitable methods for curing or cross-linking the protective coat.

In the practice of the present invention, a sensitive resinous sheet, including a contoured sheet, is coated on at least one surface with a polymerized cross-linkable protective coating mix by any of the well known methods, such as flow coating, spraying, dipping, roll coating and the like. Generally, the protective coating mix is applied in an amount sufficient to provide a cured protective layer of from about 0.01 mil to about 1 mil in thickness. The solvent, if present, is subsequently evaporated and the coating is cured.

Curing the coating mix to form the protective coating may be accomplished by anyone of the several known methods. Thermal curing, UV curing, IR curing, etc. are all suitable. This invention is in no way intended to be limited to any particular method.

In order to form the laminate or multi-layer composite, the sensitive resinous sheets thus coated with the protective coating are positioned or laid up relative to adjoining incompatible and compatible plastic sheets in a manner according to the chosen method for bonding the laminate or multi-layer composite so that the protective coating is interposed to separate the sensitive resinous lamina or layer from the incompatible adjacent plastic lamina or layer. Subsequent to the positioning or laying up, the laminate or multi-layer composite is bonded by the method which was chosen to accomplish the same. The method of bonding may include the use of an air or oil autoclave, a laminating press or other method. This invention is not to be limited by the method of bonding.

A lamina or layer of a laminate or multi-layer composite thus protected, is not susceptible to damage by incompatible adjoining laminae or layers. Additionally, great savings of effort result in that a sheet thus coated on two sides and externally positioned in the laminate or multi-layer composite is mar, scratch, and chemical solvent resistant without resort to additional labor. Alternatively, in some cases, the protective coating of the externally positioned sheet may serve as a primer layer on the external face for yet a second coating and curing sequence for an additional hard coat of a second material to enhance scratch, mar, and chemical solvent resistance, for example, a cross-linked acrylic primer layer for an organopolysiloxane hardcoat.

Thus the method of the present invention provides laminates having internally coated sensitive resinous laminae, which internal coating is a cross-linked polymer and serves as a barrier to prevent damaging interaction between the adjoining laminae or layers.

The method of the present invention with a single coating and curing process, provides a protective coating to sensitive resinous sheets which coating may serve the dual role of providing scratch and mar resistance as well as providing resistance to attack from incompatible adjoining laminae or layers.

The method of the present invention in a single coating and curing process, provides a protective coating to sensitive resinous sheets which coating may serve the dual role of providing a primer layer for a mar and scratch resistant hard coat as well as providing resistance to attack from incompatible adjoining laminae or layers.

The method of the present invention, in a single coating and curing operation, provides a multi-purpose sensitive resinous sheet suitable for both internal and external placement in a laminate or multi-layer composite.

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

This example illustrates a prior art laminate over which the present invention represents an improvement. There was laminated in the air autoclave and nylon bag at a temperature of 125°–130° C., a pressure of 6–8 atmospheres and a hold time of 30 minutes, a 1'×1' symmetrical laminate. The outer laminae were 125 mil glass, the adhesive interlayers were 16 mil plasticized polyvinyl butyral, and the central lamina was an uncoated 200 mil BPA polycarbonate sheet. Upon removal from the autoclave, the laminate was observed to be optically transparent. Upon standing at room temperature for 24–48 hours, the laminate was observed to become cloudy.

EXAMPLE 2

Example 1 was repeated except that the uncoated BPA polycarbonate sheet was replaced by one which had been coated to a thickness of ½–1 mil with a cross-linked amine-aldehyde resin containing the condensation products of hexamethoxymethylmelamine, hydroxyfunctionalized polyacrylate, 1,4 butanediol, hydroxy terminated polyester, a catalyst and solvent. In contrast to Example 1, the laminate was optically clear upon removal from the autoclave and did not exhibit any change after several months.

EXAMPLE 3

The same as Example 2 except that the coating was replaced by a radiation crosslinked polymethacrylate. The results were the same as example 2.

EXAMPLE 4

The method of Example 1 was repeated to produce a 1'×1' symmetrical laminate. Two external laminae of 250 mil BPA-polycarbonate sheet were joined by a 16 mil adhesive interlayer of plasticized polyvinyl butyral. The polycarbonate sheets were coated on both sides to a thickness of ½-1 mil with the coating of Example 2. The laminate was mar resistant and showed signs of hazing after several months.

EXAMPLE 5

The method of Example 1 was repeated to produce a 1'×1' asymmetrical laminate. A 125 mil piece of window glass was joined to a 250 mil BPA-polycarbonate sheet by 16 mil adhesive interlayer of plasticized polyvinyl butyral. The polycarbonate sheet was coated on both sides to a thickness of 1 mil with a crosslinked acrylic modified melamine. The laminate was mar resistant and showed no signs of hazing after several months.

EXAMPLE 6

The method of Example 1 was repeated to produce a 1'×1' symmetrical laminate. Two laminae of 250 mil BPA-polycarbonate sheet were joined by an adhesive interlayer of plasticized polyvinyl butyral. The polycarbonate sheets were coated on both sides to a thickness of 1 mil with an acrylic emulsion sold by B. F. Goodrich Company under the tradename Hycar 2600. The laminate was mar resistant and remained transparent with no hazing after several months.

What is claimed is:

1. A method for preventing damage in a laminate or multi-layer composite to a sensitive resinous lamina or layer by incompatible additives of adjoining plastic laminae or layers which method comprises:
   (a) coating at least one surface of a sensitive resinous sheet with a polymerized cross-linkable protective coating mixture selected from the group consisting of an acrylic based copolymer containing at least a predominance of acrylic moieties or an amine-aldehyde resin;
   (b) curing said polymerized crosslinkable protective coating mixture to form a cross-linked protective coating;
   (c) positioning said sensitive resinous sheet so that said protective coating is interposed to separate the resulting sensitive resinous lamina or layer from the resulting adjacent plastic lamina or layer; and
   (d) bonding said laminate or multi-layer composite.

2. The method of claim 1 wherein said coating step further requires that protective coating mixture be applied in such an amount to produce a cured protective coating having a thickness of from about 0.01 mil to about 1 mil.

3. The method of claim 1 wherein said coating step further requires that said polymerizable, cross-linkable, mixture is a polymerizable cross-linkable acrylic based copolymer.

4. The method of claim 1 wherein said coating step further requires that said polymerizable, cross-linkable, protective coating mixture is a polymerizable, cross-linkable, amine-aldehyde resin.

5. The method of claim 1 wherein said positioning step further requires that at least one of said adjacent plastic lamina or layer is plasticized polyvinyl butyral.

6. The method of claim 1 wherein said coating and positioning steps further require that said sensitive resinous lamina or layer be a polycarbonate lamina or layer.

7. The method according to claim 1 wherein said coating step further requires that both surfaces of said sensitive resinous sheet be coated and said positioning step further requires that said sensitive resinous sheet be externally positioned in said laminate.

8. The method according to claim 7 which additionally requires the steps following said curing step of
   (i) coating one face of said coated sheet with an additional coat of an uncured hard coat material;
   (ii) curing said uncured hard coat material to produce a two layer mar, scratch and chemical solvent resistant coating;
and wherein said positioning step further requires that said twice coated face be the externally positioned face.

9. A laminate or multi-layer composite comprising at least one lamina or layer of sensitive resin having adhered thereto on at least one internal face a polymerized, cross-linked, protective coating selected from the group consisting of an acrylic based copolymer containing at least a predominance of acrylic moieties or an amine-aldehyde resin, said protective coating having adhered thereto on the face opposite said lamina of sensitive resin an incompatible additive containing adhesive interlayer.

10. The laminate or multi-layer composite of claim 9 wherein said protective coating is from about 0.01 mil to about 1 mil in thickness.

11. The laminate or multi-layer composite of claim 9 wherein said protective coating is an acrylic based copolymer.

12. The laminate or multi-layer composite of claim 9 wherein said protective coating is an amine-aldehyde resin.

13. The laminate or multi-layer composite of claim 9 wherein said adhesive interlayer is a plasticizer containing polyvinyl butyral.

14. The laminate or multi-layer composite of claim 9 wherein said sensitive resin is polycarbonate.

15. The laminate or multi-layer composite of claim 9 wherein at least one of said at least one lamina or layer of sensitive resin is externally positioned and is coated on both its internal and external face with said polymerixable cross-linkable protective coating.

16. The laminate or multi-layer composite of claim 15 wherein said polymerizable cross-linkable protective coating of said external face has adhered thereto a second scratch and mar resistant hard coat.

* * * * *